(12) United States Patent
Rousse

(10) Patent No.: US 6,411,680 B1
(45) Date of Patent: Jun. 25, 2002

(54) TELEPHONIC APPARATUS AND INPUT DEVICE FOR TELEPHONIC APPARATUS

(75) Inventor: Olivier Rousse, Bristol (GB)

(73) Assignee: Tempo Europe Limited, Newport (GB)

( * ) Notice: Subject to any disclaimer, the term of this patent is extended or adjusted under 35 U.S.C. 154(b) by 0 days.

(21) Appl. No.: 09/276,902

(22) Filed: Mar. 26, 1999

(51) Int. Cl.[7] .......................... H04M 1/24; H04M 3/08; H04M 3/22

(52) U.S. Cl. .................. 379/21; 379/30; 379/27.05; 379/27.06; 379/29.03; 379/29.04

(58) Field of Search .................. 379/1–2, 6–8, 379/21–22, 24, 27–29, 32, 35, 1.01–1.04, 22.01–22.02, 22.03–22.07, 26.01–27.01, 29.03–29.04, 30, 32.01, 32.04

(56) References Cited

U.S. PATENT DOCUMENTS

| 5,604,785 A | * | 2/1997 | Pryor et al. ..................... 379/2 |
| 5,617,466 A | * | 4/1997 | Walance ....................... 379/28 |
| 6,061,429 A | * | 5/2000 | Clowez ........................ 379/30 |

* cited by examiner

*Primary Examiner*—Duc Nguyen
(74) *Attorney, Agent, or Firm*—Larson & Taylor, PLC

(57) ABSTRACT

A telephonic apparatus comprises terminals for connecting it to respective electric cables, telephonic circuitry, and a switch between the terminals and the circuitry. It also includes a sensor for detecting a DC voltage above a first level between said terminals. It the sensor detects a DC voltage between said terminals above the first level, it prevents the switch from connecting the circuitry between the terminals.

22 Claims, 2 Drawing Sheets

TELEPHONIC APPARATUS AND INPUT DEVICE FOR TELEPHONIC APPARATUS

FIELD OF THE INVENTION

The present invention relates to a telephonic apparatus, and to an input device for a telephonic apparatus.

BACKGROUND OF THE INVENTION

In the present document the term "telephonic apparatus" will be used to refer to any device for sending or receiving along one or more electric cables signals encoding information. It thus includes telephone apparatus (that is to say a device which converts sound signals to and from electrical signals for transmission along telephone cables), as well as, for example, facsimile machines or computer modems. One particular form of telephonic apparatus is known as a "test telephone", that is a telephone adapted for simple releasable connection to telephone cables, for example at a telephone exchange or connection box, to test what signals are being transmitted along the cables.

A telephonic device generally comprises telephonic circuitry and terminals for connection to the telephone cables. The terminals are electrically connectable to the telephonic circuitry by operating a switch (normally made up of several components) which can be configured to provide either a high or a low impedance. When the telephonic apparatus is not intended to transmit or receive signals via the telephone cables, the switch is configured to substantially remove the electrical connection between the telephonic circuitry and the telephone cables. For example, it the switch is in series with the telephonic circuitry between the terminals, the switch may enter a high impedance mode. Alternatively, if the switch is in parallel with the telephonic circuitry between the terminals, it may enter a low impedance mode. When it is desired to transmit or receive signals, the switch is configured to electrically connect the telephonic circuitry to the terminals (e.g. in the series configuration it becomes low impedance; in the parallel configuration it becomes high impedance).

In the case of a telephone, for example, the switch is usually coupled to the hook on which a hand held receiver rests, so that the circuitry of the telephone is electrically connected to the telephone cables when the user lifts the receiver from the hook. For this reason, the state in which the telephonic circuitry is electrically connected to the telephone cables is referred to as an "off-hook" state, while the state in which the telephone circuitry is not connected to the telephone cables (due to the switch being open) is referred to as the "on-hook" state.

Conventionally, the voltage of signals transmitted along telephone cables is of the order of a few volts. However, it is also known to transmit higher voltages along telephone cables to power active circuits deployed in a local distribution network. Furthermore, high voltages may arise on telephone lines by accident, for example if at some location the telephone cables have been inadvertently coupled to a mains supply.

Accordingly, it is known to design the input stages of the telephonic circuitry of a telephonic apparatus to be capable of surviving the application of voltages above the normal working range of the telephonic apparatus, so that when the circuitry is connected to the telephonic cables (e.g. by closing the switch) the telephonic circuitry is not destroyed. However, it is difficult to design telephonic circuitry to tolerate a DC voltage of above about 120V. Thus, if the voltage on the telephone cable is above this range, the circuitry will still be damaged. If, for example, the DC voltage is of the order of 300–500V, the telephonic circuitry will not survive, and will have to be repaired.

SUMMARY OF THE INVENTION

In its broadest terms, the present invention proposes that telephonic apparatus includes a sensor which determines whether a DC voltage between its input terminals is above a predetermined level, and if it is prevents the telephonic circuitry from being electrically connected between the input terminals.

Accordingly, in a first aspect, the invention provides a telephonic apparatus comprising:

two or more terminals for connecting the apparatus to respective electric cables;

a signal processor for processing electrical signals received from or for transmission to the electrical cables;

a switch for electrically connecting or disconnecting said signal processor between said terminals; and a sensor for detecting a DC voltage above a first level between said terminals;

wherein upon detection of a DC voltage between said terminals above said first level, the sensor prevents the switch from connecting said signal processor between said terminals.

The telephonic apparatus may be a telephone, in which case the signal processor is or comprises a sound generator for producing audio signals on the basis of the electrical signals. In one form, the telephonic apparatus is a test telephone, and the terminals are preferably adapted for rapid connection and disconnection to telephone cables.

The first voltage level is preferably predetermined, for example to have a value slightly above the typical level of telephonic signals, e.g. the first level may be a few volts. Alternatively the first voltage level may be programmable.

Normally, the telephonic apparatus has two terminals which are connected to respective telephone cables. However, it is possible also to conceive of arrangements in which at least one terminal is connected not to a telephone cable, but to a cable which is connected to earth.

The sensor may be constantly sensitive to the presence of a DC voltage level between the input terminals above the first level (an "over-voltage"). Alternatively the sensor may have two states, an active state in which it is sensitive to the presence of a DC voltage level between the input terminals above the first level, and a passive state in which even if the DC voltage between the input terminals is above the first level it does not prevent the switch from connecting the signal processor to the input terminals. The sensor may be triggerable from the passive to the active state by the user, for example upon the user attempting to operate the switch to connect the signal processor to the terminals, the sensor may be triggered into the active state, so that it can check the voltage between the terminals does not exceed the first voltage before the signal processor in connected between the electrical cables, and prevent such a connection in the case that such a voltage is present. Alternatively, the sensor may be triggerable from the passive to the active state by connection of the input terminals to the telephone cables. This is particularly advantageous in the case that the telephonic apparatus is a test telephone, because in that case the apparatus can test for the presence of voltages above the first level whenever the user connects the test telephone to a new set of telephone cables. For example, if the user is testing a plurality of cables by repeatedly selecting two or more cables from among them and connecting the test telephone to the selected two cables, the sensor can detect the presence of an over-voltage whenever that connection is made.

The sensor may revert from the active state to the passive state spontaneously, for example after being in the active state for a certain time period (which may be programmable by the user or alternatively predetermined).

Upon the sensor detecting the presence of a voltage above the first level, it may indicate this fact to the user. For example, the telephonic apparatus may include a display, such as an LED, which visually indicates that a DC voltage above the first level has been detected. Alternatively, or additionally, the telephonic apparatus may generate an audio signal to indicate the presence of a voltage above the first level. For example, if the telephonic apparatus is a telephone, it may include a connection between the sensor and the sound generator of the telephone so that upon detection of an over-voltage the sound generator can be instructed to generate an audio warning tone. This tone may be continuous, but is more preferably intermittent. In the second case, during the intervals between the warning tones the sound generator may generate sounds derived from the telephone cables, for example based on electrical signals superimposed on the high DC voltage.

In a preferred form the sensor also has means for detecting the presence of a DC voltage between the terminals. There may be a minimum threshold voltage that must be found before the sensor proceeds to check for an over-voltage. Such an "under-voltage" state may indicate that the electric cables to which the terminals are connected are incorrectly wired.

Preferably, the telephonic apparatus further includes a detector for detecting digital signals (e.g. a digital signal carrier) present in the voltage between the terminals. Suitable circuitry for performing such detection is included within telephone cable testing apparatus sold by Chesilvale Electronics Limited of Newport in South Wales. Other suitable circuitry is shown in U.S. Pat. No. 5,140,614. The option of making the telephonic apparatus sensitive to digital signals is particularly useful if the telephonic apparatus is a test telephone, since in that case an operative using the test telephone can derive additional information concerning the cables he tests. The telephonic apparatus may include an indicator (e.g. visual or audio) that the detector has detected digital signals, and the detector may further be arranged to prevent electrical connection of a signal processor to the telephone cables in the case that the digital signal has been detected.

Like the over-voltage sensor, the digital signal detector may have an active state in which it detects digital signals, and a passive state in which it is sensitive to digital signals. The detector may be triggerable from the passive state to the active state by the user, or by connection of the telephonic apparatus (e.g. test telephone) to the telephone cables. Reversion from the active to the passive state may be after the passage of a time period (either preset or programmable), or upon the user signalling to the detector to revert to the passive state. In the latter case, the user has effectively over-ridden the digital signal detector. In preferred embodiments, the digital signal detector may be over-written in this way, but the over-voltage sensor cannot be over-ridden, so that the user cannot inadvertently expose the telephonic circuitry to a high DC voltage.

In a second aspect, the invention provides an input device for a telephonic apparatus comprising:

two or more cable terminals for connecting the input device to respective electric cables;

two or more apparatus terminals for connecting the input device to the telephonic apparatus;

a switch for electrically connecting or disconnecting said cable terminals to or from respective said apparatus terminals; and a sensor for detecting a DC voltage above a first level between said cable terminals;

wherein upon detection of a DC voltage between said cable terminals above said first level, the sensor prevents the switch from connecting said cable terminals to said apparatus terminals.

The input device of the invention may further have any of the optional features described above in relation to the telephonic apparatus of the invention.

The invention further provides a method of protecting a telephonic apparatus from a voltage above a (e.g. predetermined) level, the method including detecting a voltage on one or more electric cables above said level, and, upon that detection, preventing electrical connection between a signal processor of the telephonic apparatus and the one or more electric cables.

These and other objects, features and advantages of the invention will be better appreciated from consideration of the following detailed description read in conjunction with the accompanying drawings.

DETAILED DESCRIPTION

Figure 1:
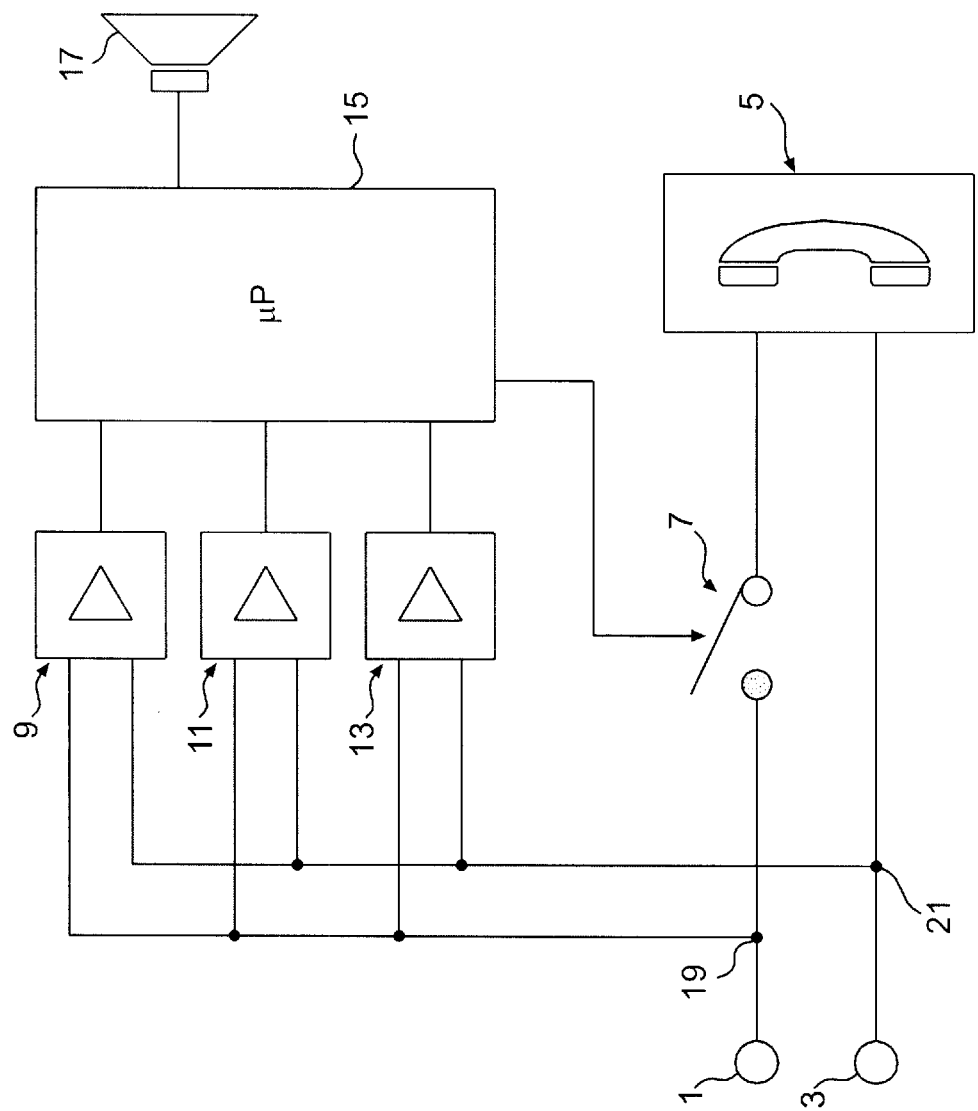
FIG. 1 is a schematic representation of a first embodiment of the telephonic apparatus of the invention.

The embodiment of the telephonic apparatus of the invention shown in FIG. 1 is a test telephone. It includes input terminals 1, 3 (which are adapted for connection to telephone cables, for example by having suitable clips), conventional telephone circuitry 5 (including a signal processor, which is (or comprises) a sound generator, and, optionally, a component for converting sounds into electrical signals, dialling circuitry, etc.). The telephone circuitry 5 is connected between the input terminals 1, 3 via a switch 7. When the switch is open (the telephone is on-hook) the impedance of the switch 7 is so great that the circuitry 5 is not exposed to voltages between the input terminals 1, 3. However, when the switch 7 is closed (the telephone is off-hook) the circuitry 5 is connected between the input terminals 1, 3. The telephone further includes a sensor 9 for detecting DC voltages between the input terminals 1, 3 above a first predetermined (or programmable) level. It also includes a sensor 11 for detecting that the DC voltage between the input terminals 1, 3 is below a second predetermined (or programmable) level. It further includes a digital signal detector 13 for detecting digital voltage signals between the terminals 1, 3. Upon either of the sensors 9, 11 detecting that the DC voltage is outside an acceptable range (i.e. there is an under-voltage or an over-voltage), or upon the digital signal detector 13 detecting that a digital signal is present between the input terminals 1, 3, a signal is transmitted to a microcontroller 15. The microcontroller 15 opens a switch 7 so that the telephone circuitry is electrically disconnected from the input terminals 1, 3. The microprocessor 15 further triggers the generation of an alarm tone by a sound generator 17 (which may or may not be the same as a sound generator of the telephone circuitry 5).

Figure 2:
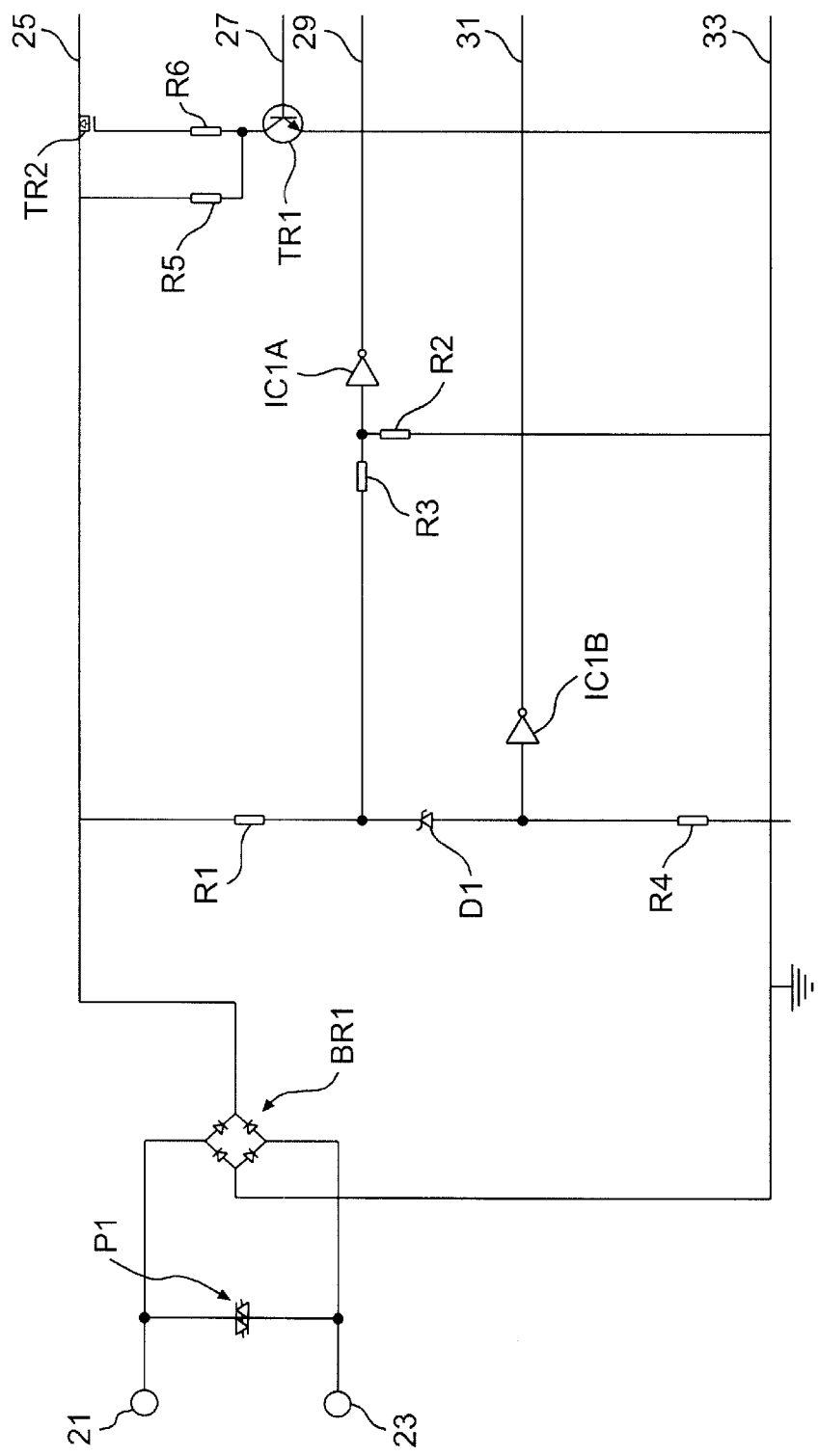
FIG. 2 shows a possible form of circuitry in a second embodiment of the telephonic apparatus of the invention.

Turning now to FIG. 2, a test telephone is shown which is a second embodiment of the invention. Input terminals 21, 23 are adapted for connection to telephone cables. A surge protection device P1 is connected between the input terminals 21, 23. A bridge of diodes BR1 is also included to provide polarity protection. Resistors R1, R4, a non-linear voltage dependent impedance (e.g. Zener diode) D1 and a threshold detector IC1B (which may be an analog-to-digital converter optionally including software) act together as a high voltage sensor, to generate a high voltage detection signal on a line 31. Resistors R2 and R3 and a threshold detector IC1A act together to detect that there is a voltage between the input terminals 21, 23, and produce a signal accordingly on line 29. Lines 25 and 33 are respectively connected to telephone circuitry. The transistors TR1, TR2 and resistors R5, R6 together constitute the hook switch (corresponding to the switch 7 in FIG. 1) which can connect the telephone circuitry to the telephone. The switch goes lower impedance ("off hook") in response to a signal generated on line 27 by a microprocessor which receives input signals along lines 29, 31. That is, the microprocessor can effectively electrically disconnect the telephone circuitry from the input terminals 21, 23 by generating a signal on the line 27.

Although not shown in FIG. 2, the circuitry may further include a digital signal detector (for example employing the same circuitry as the digital signal detector present in attest telephone produced by Chesilvale Electronics Limited, Newport, South Wales) which generates a further signal to the microprocessor, causing it to control the switching accordingly.

The embodiments shown are for illustration only, and many modifications are possible within the scope of the invention as will be clear to a skilled person. For example, the circuitry for detecting over-voltage, low voltage or digital signals may include a mechanism for timing-out the detection, that is (in the case of the second embodiment) making the signal on line 27 independent of over-voltage, under-voltage or the presence of digital signals after respective pre-set or programmable durations.

Also, although the two embodiments illustrated are both telephonic apparatus, the skilled person will appreciate how the invention can be adapted to produce a separate input device for a telephonic apparatus (essentially based on the input portions of the telephonic apparatus illustrated above).

What is claimed is:

1. A telephonic apparatus comprising:
    at least two terminals for connecting the apparatus to respective electric cables;
    a signal processor for processing electrical signals received from or for transmission to the electrical cables;
    a switch for electrically connecting or disconnecting said signal processor between said terminals; and
    a sensor for detecting: a DC voltage above a first level between said terminals and for, upon detection of a DC voltage between said terminals above said first level, preventing the switch from connecting said signal processor between said terminals; said sensor having two states, an active state in which the sensor is sensitive to the presence of a DC voltage level between said terminals above said first level, and a passive state in which, even if the, DC voltage between said terminals is above said first level, the sensor does not prevent the switch from connecting the signal processor between said terminals.

2. The telephonic apparatus of claim 1, wherein the telephonic apparatus is a telephone, and the signal processor comprises a sound generator for producing audio signals on the basis of the electrical signals.

3. The telephonic apparatus of claim 2, wherein the telephonic apparatus is a test telephone, and the terminals are adapted for rapid connection and disconnection to telephone cables.

4. The telephonic apparatus of claim 1, wherein said voltage level is predetermined.

5. The telephonic apparatus of claim 4, wherein said voltage level is programmable.

6. The telephonic apparatus of claim 1, wherein the sensor is triggerable from the passive to the active state by the user.

7. The telephone apparatus of claim 1, further comprising indication means for, responsive to the sensor detecting the presence of a voltage above said first level, providing a corresponding indication to the user using said indication means.

8. The telephonic apparatus of claim 7, wherein said indication means comprises a connection between the sensor and a sound generator of the signal processor, and upon detection of a DC voltage between the terminals the sensor provides a corresponding indication to the user by generating an audio warning tone.

9. The telephonic apparatus of claim 8, wherein said audio warning tone is intermittent, and during the intervals in which the audio warning tone is not generated the sound generator generates sounds derived from the telephone cables.

10. The telephonic apparatus of claim 1, further including a detector for detecting a digital signal present in the voltage between said terminals, and for preventing electrical connection of said signal processor between the cables responsive to a digital signal being detected.

11. The telephonic apparatus of claim 1, wherein the sensor is triggerable from the passive to the active state by connection of said terminals to telephone cables.

12. The telephonic apparatus of claim 11, wherein the sensor reverts from the active state to the passive state spontaneously after being in the active state for a time period.

13. The telephonic apparatus of claim 1, wherein the sensor is also sensitive to whether a DC voltage between said terminals is below a second level, and upon detection of this fact prevents electrical connection of said signal processor between the cables.

14. A telephonic apparatus comprising:
    at least two terminals for connecting the apparatus to respective electric cables;
    a signal processor for processing electrical signals received from or for transmission to the electrical cables;
    a switch for electrically connecting or disconnecting said signal processor between said terminals; and
    a sensor for detecting a DC voltage above a first level between said terminals and for, upon detection of a DC voltage between said terminals above said first level, preventing the switch from connecting said signal processor between said terminals, and for detecting a DC voltage between said terminals below a second level, and for, responsive to detection of a DC voltage of between said terminals below said second level, preventing electrical connection of said signal processor between the cables.

15. The telephonic apparatus of claim 14, wherein the telephonic apparatus is a telephone, and tie signal processor comprises sound generator for producing audio signals on the basis of the electrical signals.

16. The telephonic apparatus of claim 14, wherein the telephonic apparatus is a test telephone, and the terminals are adapted for rapid connection and disconnection to telephone cables.

17. The telephonic apparatus of claim 14, wherein said first voltage level is predetermined.

18. The telephonic apparatus of claim 14, wherein said first voltage level is programmable.

19. The telephonic apparatus of claim 14, further comprising indication means for, responsive to the sensor detecting the presence of a voltage above said first level, providing a corresponding indication to the user using said indication means.

20. The telephonic apparatus of claim 19, wherein said indication means comprises a connection between the sensor and a sound generator of the signal processor, and upon detection of a DC voltage between the terminals, the sensor provides a corresponding indication to the user by generating an audio warning tone.

21. The telephonic apparatus of claim 20, wherein said audio warning tone is intermittent, and during the intervals in which the audio warning tone is not generated the sound generator generates sounds derived from the telephone cables.

22. The telephonic apparatus of claim 14, further including a detector for detecting a digital signal present in the voltage between said terminals, and for preventing electrical connection of said signal processor between the cables responsive to a digital signal being detected.

* * * * *